US012579778B2

(12) United States Patent
Li et al.

(10) Patent No.: US 12,579,778 B2
(45) Date of Patent: Mar. 17, 2026

(54) PATTERN MATCHING DEVICE, PATTERN MEASURING SYSTEM, PATTERN MATCHING PROGRAM

(71) Applicant: Hitachi High-Tech Corporation, Tokyo (JP)

(72) Inventors: Liang Li, Tokyo (JP); Wataru Nagatomo, Tokyo (JP); Yuichi Abe, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 657 days.

(21) Appl. No.: 18/009,783

(22) PCT Filed: Jul. 9, 2020

(86) PCT No.: PCT/JP2020/026773
§ 371 (c)(1),
(2) Date: Dec. 12, 2022

(87) PCT Pub. No.: WO2022/009357
PCT Pub. Date: Jan. 13, 2022

(65) Prior Publication Data
US 2023/0298310 A1 Sep. 21, 2023

(51) Int. Cl.
*G06V 10/75* (2022.01)
*G06T 5/50* (2006.01)
(Continued)

(52) U.S. Cl.
CPC ............ *G06V 10/7515* (2022.01); *G06T 5/50* (2013.01); *G06V 10/60* (2022.01); *G06V 10/761* (2022.01);
(Continued)

(58) Field of Classification Search
CPC .. G06V 10/7515; G06V 10/60; G06V 10/761; G06V 10/774; G06T 5/50;
(Continued)

(56) References Cited

U.S. PATENT DOCUMENTS

| | | | |
|---|---|---|---|
| 6,627,888 B2 | 9/2003 | Yamaguchi et al. | |
| 7,235,782 B2 | 6/2007 | Takane et al. | |
| | (Continued) | | |

FOREIGN PATENT DOCUMENTS

| | | |
|---|---|---|
| CN | 101996398 A | 3/2011 |
| JP | 2001-148016 A | 5/2001 |
| | (Continued) | |

OTHER PUBLICATIONS

Buniatyan, Davit, et al. "Deep learning improves template matching by normalized cross correlation." arXiv preprint arXiv: 1705.08593 (2017). (Year: 2017).*
(Continued)

*Primary Examiner* — Sean M Conner
(74) *Attorney, Agent, or Firm* — Crowell & Moring LLP

(57) ABSTRACT

The present disclosure proposes a pattern matching device capable of achieving matching processing that is characterized by involving a learning function even for a semiconductor pattern including a repetitive pattern, in particular. The pattern matching device pertaining to the present disclosure is provided with a learning unit for estimating a first correlation image having, as pixel values thereof, numerical values representing a correlation between a first image and a second image. The pattern matching device calculates a second correlation image having, as pixel values thereof, numerical values representing the correlation between a derivative image generated from the first image and the first image, and the learning unit performs learning so as to
(Continued)

reduce the difference between the first correlation image and the second correlation image (refer to FIG. 1).

16 Claims, 10 Drawing Sheets

(51) Int. Cl.
  *G06V 10/60*          (2022.01)
  *G06V 10/74*          (2022.01)
  *G06V 10/774*         (2022.01)

(52) U.S. Cl.
  CPC .. *G06V 10/774* (2022.01); *G06T 2207/10061* (2013.01); *G06T 2207/20081* (2013.01); *G06T 2207/20221* (2013.01)

(58) Field of Classification Search
  CPC . G06T 2207/10061; G06T 2207/20081; G06T 2207/20221; G06T 2207/20084; G06T 7/32; G06T 7/74; H01J 37/22; H01J 37/222; H01J 37/28; H01J 2237/2817
  See application file for complete search history.

(56)               References Cited

U.S. PATENT DOCUMENTS

| | | | |
|---|---|---|---|
| 2007/0075271 A1 | 4/2007 | Faber | |
| 2011/0038527 A1 | 2/2011 | Liu | |
| 2013/0278748 A1 | 10/2013 | Nakayama et al. | |
| 2014/0023265 A1* | 1/2014 | Kitazawa .............. | G06T 7/0004 |
| | | | 382/151 |
| 2017/0109607 A1* | 4/2017 | Nagatomo ................ | G06T 7/74 |
| 2018/0075594 A1 | 3/2018 | Brauer | |
| 2020/0005141 A1 | 1/2020 | Ambikapathi et al. | |
| 2021/0374936 A1 | 12/2021 | Koopman et al. | |

FOREIGN PATENT DOCUMENTS

| | | | |
|---|---|---|---|
| JP | 2007-86066 A | | 4/2007 |
| JP | 4199939 B2 | | 12/2008 |
| JP | 4218171 B2 | | 2/2009 |
| JP | 2013-229394 A | | 11/2013 |
| TW | 201824417 A | | 7/2018 |
| TW | 201942769 A | | 11/2019 |
| TW | 202001696 A | | 1/2020 |

OTHER PUBLICATIONS

Eppenhof, Koen AJ, et al. "Deformable image registration using convolutional neural networks." Medical Imaging 2018: Image Processing. vol. 10574. SPIE, 2018. (Year: 2018).*

Fan, Jingfan, et al. "Adversarial similarity network for evaluating image alignment in deep learning based registration." International Conference on Medical Image Computing and Computer-Assisted Intervention. Cham: Springer International Publishing, 2018. (Year: 2018).*

International Search Report (PCT/ISA/210) issued in PCT Application No. PCT/JP 2020/026773 dated Sep. 29, 2020 with English translation (five (5) pages).

Japanese-language Written Opinion (PCT/ISA/237) issued in PCT Application No. PCT/JP 2020/026773 dated Sep. 29, 2020 (four (4) pages).

Taiwanese-language Office Action issued in Taiwanese Application No. 110123568 dated Apr. 13, 2022 (six (6) pages).

Rocco, I et al. Convolutional neural network architecture for geometric matching. In Proceedings of the IEEE Conference on Computer Vision and Pattern Recognition (CVPR), 2017 (15 pages).

Seifi, M. et al. Fast Diffraction-Pattern Matching for Object Detection and Recognition in Digital Holograms. Publication in the conference proceedings of EUSIPCO 2013, 1569734797, pp. 1-5, sections 2-4, fig. 2-4 dated Sep. 9, 2013 (five (5) pages).

\* cited by examiner

1302
INPUT MATCHING
SHIFT AMOUNT

211

201
IMAGE
CROPPING
UNIT

202

203
CORRELATION
CALCULATOR

Figure 7:
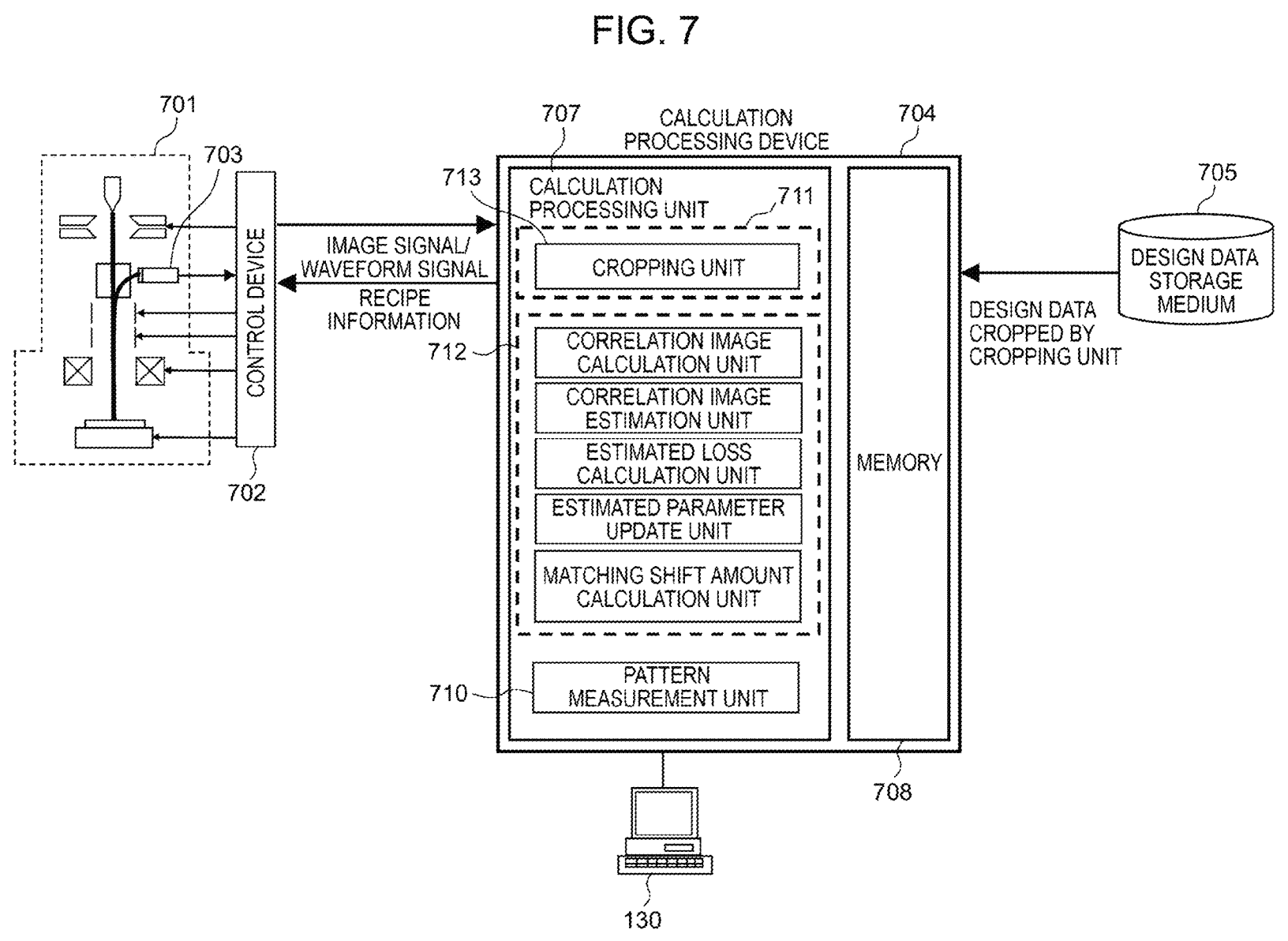

705 DESIGN DATA STORAGE MEDIUM

DESIGN DATA CROPPED BY CROPPING UNIT

704 MEMORY

708

707 CALCULATION PROCESSING DEVICE

CALCULATION PROCESSING UNIT

711 CROPPING UNIT

712
CORRELATION IMAGE CALCULATION UNIT
CORRELATION IMAGE ESTIMATION UNIT
ESTIMATED LOSS CALCULATION UNIT
ESTIMATED PARAMETER UPDATE UNIT
MATCHING SHIFT AMOUNT CALCULATION UNIT

PATTERN MEASUREMENT UNIT

710

713

IMAGE SIGNAL/ WAVEFORM SIGNAL

RECIPE INFORMATION

703

CONTROL DEVICE

702

701

130

901

TRAINING DATA
GENERATION UNIT

8206

MATCHING SHIFT AMOUNT
GENERATION UNIT

904

905

IMAGE
CROPPING UNIT

908

906

IMAGE
STYLE

907

PSEUDO SEM IMAGE
GENERATION UNIT

GENERATED MATCHING
SHIFT AMOUNT

903

902

PATTERN MATCHING DEVICE, PATTERN MEASURING SYSTEM, PATTERN MATCHING PROGRAM

TECHNICAL FIELD

The present disclosure relates to a technology for performing pattern matching between images.

BACKGROUND ART

A device that measures and inspects a pattern formed on a semiconductor wafer aligns a field of view of an inspection device for desired measurement or a measurement position by using a template matching technology. The template matching refers to a process of finding an area that best matches a template image registered in advance from an image to be searched. JP4218171B (PTL 1) discloses an example of such template matching.

JP4199939B (PTL 2) discloses a method of generating a template for template matching based on design data of a semiconductor device. When a template can be generated based on design data, there is an advantage such as elimination of a labor of deliberately obtaining an image with an inspection device for template generation.

I. Rocco, R. Arandjelovic and J. Sivic. Convolutional neural network architecture for geometric matching. In Proceedings of the IEEE Conference on Computer Vision and Pattern Recognition (CVPR), 2017 (NPL 1) disclose a trainable deep learning model that receives two images and outputs a conversion parameter (for example, a matching shift amount) that is present in an image. Training by using training data can implement highly precise model training, and thus there is an advantage that it is not required to manually process an input image.

CITATION LIST

Patent Literature

PTL 1: JP4218171B (corresponding U.S. Pat. No. 6,627, 888B)
PTL 2: JP4199939B (corresponding U.S. Pat. No. 7,235, 782B)

Non-Patent Literature

NPL 1: I. Rocco, R. Arandjelovic and J. Sivic. Convolutional neural network architecture for geometric matching. In Proceedings of the IEEE Conference on Computer Vision and Pattern Recognition (CVPR), 2017

SUMMARY OF INVENTION

Technical Problem

In template matching, when there is a large discrepancy in image appearances between a template image and an image to be searched, matching may fail. Examples of a reason that a discrepancy in image appearances between a template image and an image to be searched is large include: (a) a case where a difference between an image capturing condition of an inspection device when a template is registered and an image capturing condition of the inspection device when an image to be searched is captured is large, (b) a case where a difference between a performance of a semiconductor pattern image-captured when a template is registered and a performance of the semiconductor pattern when an image to be searched is captured is large, (c) a case where a difference between a degree of shift in upper and lower layers of a semiconductor multilayer pattern image-captured when a template is registered and a degree of shift in the upper and lower layers of the semiconductor multilayer pattern when an image to be searched is captured, in a multilayer pattern, is large and (d) a semiconductor process of the semiconductor pattern when a template is registered and a process of manufacturing the semiconductor pattern when an image to be searched is captured are different from each other (this may be performed in order to reduce the number of template registration processes by using a template image generated in another process).

PTL 1 does not disclose how to process a matching process when a discrepancy occurs between a template image and an image to be searched.

PTL 2 discloses generation of a template close to a pattern of an actual image by performing a smoothing process on graphic data generated based on design data and rounding each unit of the pattern. However, it is difficult to deal with every discrepancy between a template image and an image to be searched.

In addition, in the pattern matching in the related art as in PTLs 1 and 2, when the template matching fails due to such a discrepancy, it takes time for improving an algorithm, and thus the improvement cannot be easily made in a short period of time.

NPL 1 discloses that, highly precise model training can be implemented while a discrepancy between two images is absorbed by training in a short period of time. However, in the semiconductor pattern, it is difficult to train a deep learning model for a characteristic repetitive pattern (a pattern with a plurality of correct matching positions, that is, a plurality of matching shift amounts). Since the repetitive pattern has a plurality of same shapes in a proximity range (for example, in a field of view), there are a plurality of candidates of a correct matching position, and thus it is difficult to specify a true correct position.

The disclosure is conceived to solve such a problem, and suggests a pattern matching device that can implement a matching process characterized by having a training function, also for a semiconductor pattern particularly including a repetitive pattern.

Solution to Problem

According to the disclosure, a pattern matching device includes a training unit that estimates a first correlation image having, as a pixel value, a numerical value indicating correlation between a first image and a second image, the pattern matching device calculates a second correlation image having, as a pixel value, a numerical value indicating correlation between a derivative image generated from first image and the first image, and the training unit performs training such that a difference between the first correlation image and the second correlation image is decreased.

Advantageous Effects of Invention

According to the disclosure, it is possible to implement a matching process characterized by having a training function, also for a semiconductor pattern particularly including a repetitive pattern by using this pattern matching device.

BRIEF DESCRIPTION OF DRAWINGS

FIG. 7 illustrates another configuration example of a pattern measuring system of FIG. 6.

DESCRIPTION OF EMBODIMENTS

Hereinafter, a pattern matching device, a pattern measuring system, and a pattern matching program according to the disclosure are described with reference to the accompanying drawings. In the accompanying drawings, functionally identical elements may be denoted with the same or corresponding numbers. The accompanying drawings illustrate embodiments and implementations consistent with the principles of the disclosure and are provided for the purpose of understanding the disclosure but are not used to interpret the disclosure in a limiting manner, at all. The description of the present specification is merely an example and is not intended to limit the scope or application of the claims of the disclosure in any way.

Embodiment 1

Figure 1:
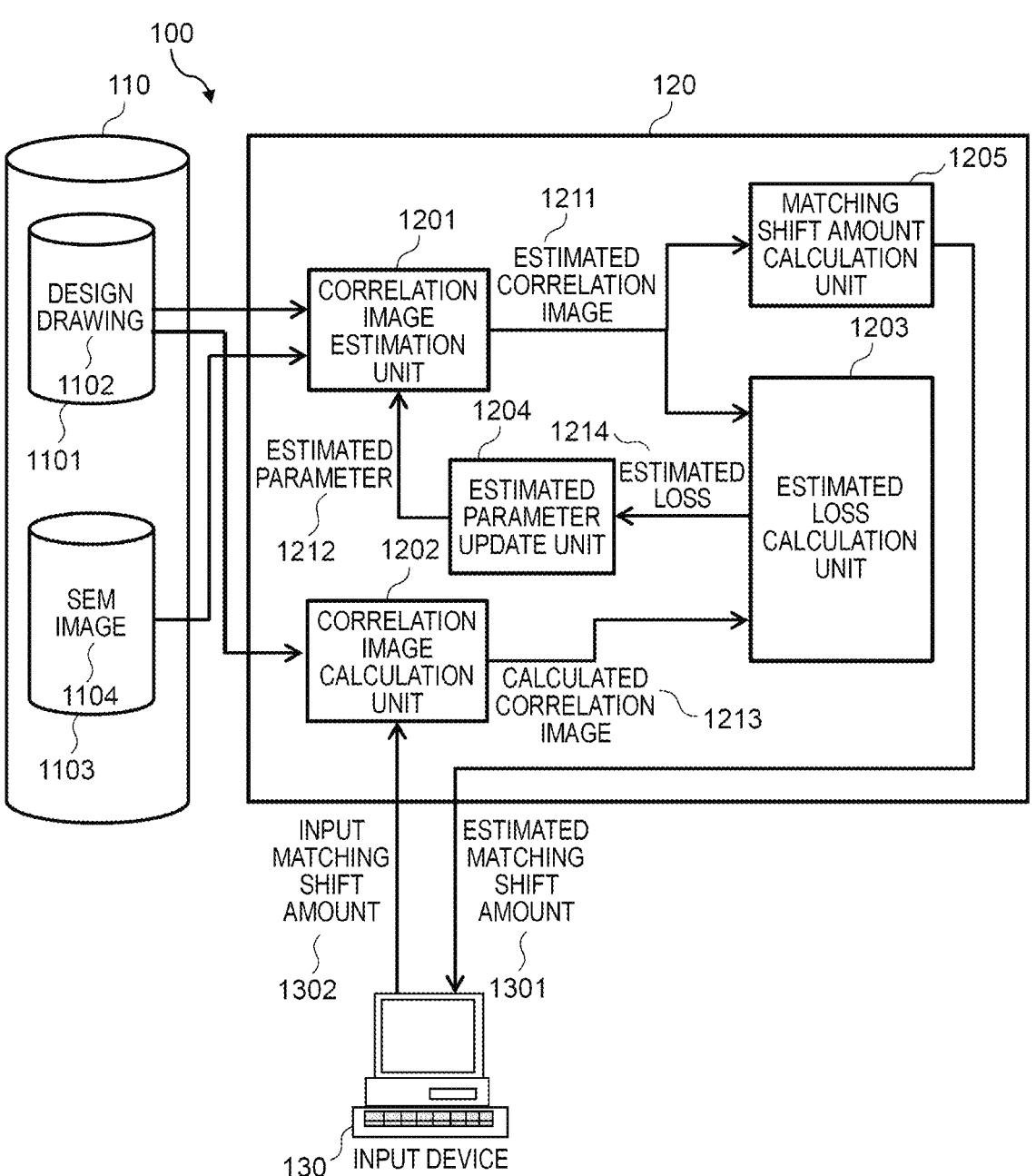
FIG. 1 illustrates a configuration example of a pattern matching device 100 according to Embodiment 1.

FIG. 1 is a configuration example of a pattern matching device 100 according to Embodiment 1 of the disclosure. The pattern matching device 100 can be configured as a calculation device that performs a pattern matching process. The pattern matching device 100 can be configured by a storage medium 110, a pattern matching system 120, and an input device 130.

FIG. 1 illustrates a configuration example of performing a pattern matching process particularly by a calculation processing device. For example, the pattern matching process includes a process of obtaining a matching shift amount for position alignment between a template image stored in a storage medium 1103 (a SEM image 1104 obtained by a measurement device) and an image to be searched stored in a storage medium 1101 (a design drawing 1102 obtained from design data). The template image is not limited to a SEM image and may be another kind of image, for example, a design drawing. In addition, the image to be searched is not limited to a design drawing and may be another kind of image, for example, a SEM image.

According to Embodiment 1, a scanning electron microscope (SEM) is used as an example of the measurement device. The SEM is used for measuring a dimension of a pattern of a semiconductor device formed on a semiconductor wafer. A specific configuration example of the SEM is described below with reference to FIG. 6.

The pattern matching system 120 is configured with one or more computer subsystems including one or more central processing units (CPU) or graphics processing units (GPU). The pattern matching system 120 includes one or more components executed by the one or more computer subsystems. The one or more computer systems can implement a process described below with software by using one or more processors and can implement a part or all of the processes in hardware such as an electronic circuit.

The pattern matching system 120 performs a pattern matching process between the design drawing 1102 stored in the storage medium 1101 and the SEM image 1104 stored in the storage medium 1103. As a result of the pattern matching process, an estimated matching shift amount 1301 is output. The estimated matching shift amount 1301 indicates a position shift amount or a position difference between the design drawing 1102 and the SEM image 1104.

The estimated matching shift amount 1301 can be indicated by a two-dimensional scalar value, for example, (an X-direction shift amount and a Y-direction shift amount).

For example, the pattern matching system 120 includes a correlation image estimation unit 1201, a correlation image calculation unit 1202, an estimated loss calculation unit 1203, an estimated parameter update unit 1204, and a matching shift amount calculation unit 1205. The pattern matching system 120 is configured to receive an input of various kinds of information from the input device 130.

The correlation image estimation unit 1201 estimates an estimated correlation image 1211 between the design drawing 1102 and the SEM image 1104. The matching shift amount calculation unit 1205 calculates the estimated matching shift amount 1301 by using the estimated correlation image 1211.

The correlation image is an image obtained by arranging correlation values between template images and images to be searched over the entire image to be searched. More specifically, an image having the same size as the template image is cropped from the image to be searched, and correlation values between the cropped image and the template image are obtained. The cropped image is cropped by raster scanning the image to be searched (sliding window). An image obtained by arranging the obtained correlation values for each of the displacement (slide) of the cropped image in the X direction and displacement (slide) in the Y direction as pixel values is referred to as a correlation image. The more the template image and the cropped image match, the higher the correlation value is calculated (in contrast, the correlation value may be designed to be calculated lower). Therefore, at a position where the correlation between image to be searched and the cropped image is high, the pixel value increases (the brightness value is high), and at a position where the correlation is low, the pixel value decreases (the brightness value is small).

The correlation image estimation unit 1201 is configured with a training unit that receives an input of the design drawing 1102 and the SEM image 1104 and estimates the estimated correlation image 1211 between the two input images. The correlation image estimation unit 1201 receives an input of a deep learning model trained with an updated estimated parameter 1212 and estimates the estimated correlation image 1211 by using the deep learning model. The estimated parameter 1212 is appropriately updated by the estimated parameter update unit 1204, and supplied to the correlation image estimation unit 1201. The training unit can be configured, for example, with a neural network structure described below with reference to FIG. 3.

The correlation image calculation unit 1202 receives an input of the design drawing 1102 and an input matching shift amount 1302 and calculates a calculated correlation image 1213. The input matching shift amount 1302 can be input from the input device 130. The calculated correlation image 1213 can be used as training data when the training unit performs training.

The estimated loss calculation unit 1203 calculates an estimated loss 1214 between the estimated correlation image 1211 and the calculated correlation image 1213. Specifically, a sum of differences between respective pixel values of the estimated correlation image 1211 estimated by the correlation image estimation unit 1201 and respective pixel values of the calculated correlation image 1213 to be the training data is obtained by a loss function. The loss is calculated by a mean squared error, a mean absolute error, or the like. The loss function is not limited thereto and may be any function that can calculate the difference between the images.

The estimated parameter update unit 1204 adjusts a parameter of the training unit in the correlation image estimation unit 1201 so that an estimated loss of the pixel values in the estimated correlation image 1211 decreases and supplies the parameter to the correlation image estimation unit 1201.

The deep learning model that brings the estimated correlation image 1211 closer to the calculated correlation image 1213 can be trained by repeating estimation and back propagation as above, one or more times. Even in case of an image having a plurality of correct matching positions like a repetitive pattern that is characteristic of a semiconductor pattern, there is one correlation image, thus the training can be performed appropriately.

By using a trained deep learning model included in the correlation image estimation unit 1201, the estimated correlation image 1211 between the design drawing 1102 and the SEM image 1104 to be matched is estimated. The matching shift amount calculation unit 1205 calculates the estimated matching shift amount 1301 from the estimated correlation image 1211. As the method of calculating a matching shift amount, for example, the following procedure can be used.

(First Procedure of Calculating Matching Shift Amount)

The highest pixel value of the estimated correlation image 1211 is (highest brightness pixel) is specified. The position of the highest brightness pixel is a position where the design drawing 1102 and the SEM image 1104 are most matched, and thus a matching shift amount is indicated. However, the following origin correction is required. The pixel value of the estimated correlation image 1211 is set by shifting the coordinates with the upper left end portion of the estimated correlation image 1211 as the origin and calculating correlation values at respective shift positions. Meanwhile, the central position of the design drawing 1102 or the SEM image 1104 may be set as the origin. In this manner, when the origin position is different between the estimated correlation image 1211 and the design drawing 1102 or between the estimated correlation image 1211 and the SEM image 1104, correction for matching the origin position is required. From the position of the highest brightness pixel after the origin correction, the matching shift amount between the design drawing 1102 and the SEM image 1104 can be obtained.

(Second Procedure of Calculating Matching Shift Amount)

Instead of the pixel with the highest brightness, the matching shift amount may be obtained by specifying all pixel values that are equal to or more than a threshold value and using a pixel value that is closest to a designated position (for example, the center of an image) in the image among the pixel values. When the origin correction is required, the origin correction is performed in the same manner as that in the first procedure.

As above, by the estimation of the correlation image by the correlation image estimation unit 1201 (trained deep learning model) and the estimation of the matching shift amount from the correlation image by the matching shift amount calculation unit 1205, the deep learning model for obtaining a matching shift amount can be implemented even in a pattern of a semiconductor including a repetitive pattern.

In the learning of the correlation image, a correlation image (enhanced correlation image) in which information of an edge of a pattern in the horizontal direction and information of an edge in the vertical direction are separated, and information in the respective directions is enhanced may be learned. In this case, the training unit is configured to (a) estimate a correlation image in the vertical direction which has, as a pixel value, a correlation value indicating a degree in which the design drawing 1102 and the SEM image 1104 match in the vertical direction and (b) estimate a correlation image in the horizontal direction which has, as a pixel value, a correlation value indicating a degree in which the design drawing 1102 and the SEM image 1104 match in the horizontal direction. The pattern matching system 120 can generate the estimated correlation image 1211 by synthesizing the correlation image in the vertical direction and the correlation image in the horizontal direction. The correlation in the horizontal direction and the correlation in the vertical direction are separated and respectively learned, so that the information in the direction which has a comparatively smaller information amount can be enhanced and learned. Accordingly, matching can be stably performed. The pattern information separation is not limited to the horizontal edge and the vertical edge and may be any edges in a direction in which training can be stably performed.

Figure 2:
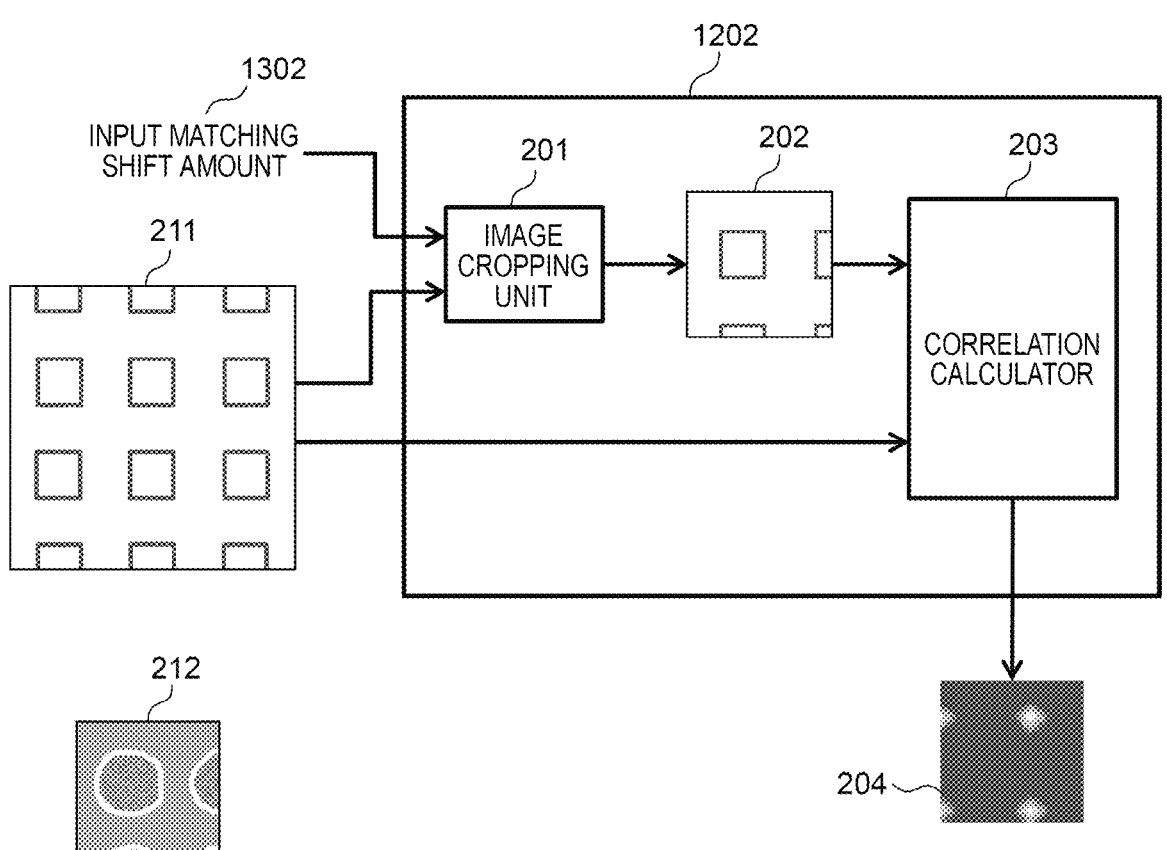
FIG. 2 illustrates a configuration example of a correlation image calculation unit 1202.

FIG. 2 illustrates a configuration example of the correlation image calculation unit 1202. An image 211 is an example of the design drawing 1102, and an image 212 is an example of the SEM image 1104. The input matching shift amount 1302 is a matching shift amount between the image 211 and the image 212 which are input by the user.

An image cropping unit 201 crops an image 202 from the image 211. The image 202 is an image obtained by cropping an area having the same size as the image 212 from the image 211 at a position designated by the input matching shift amount 1302. A correlation calculator 203 calculates a correlation image 204 between the image 202 and the image 211. The correlation calculator 203 calculates the correlation image 204 by using a method, for example, normalized cross-correlation. The image 211 and the image 202 may be pre-processed to obtain correlation images that are easy to learn. The method of calculating the correlation image 204 is not limited to these methods and may be any method by which the highest (or the lowest) correlation value at the correct matching position is calculated.

Figure 3:
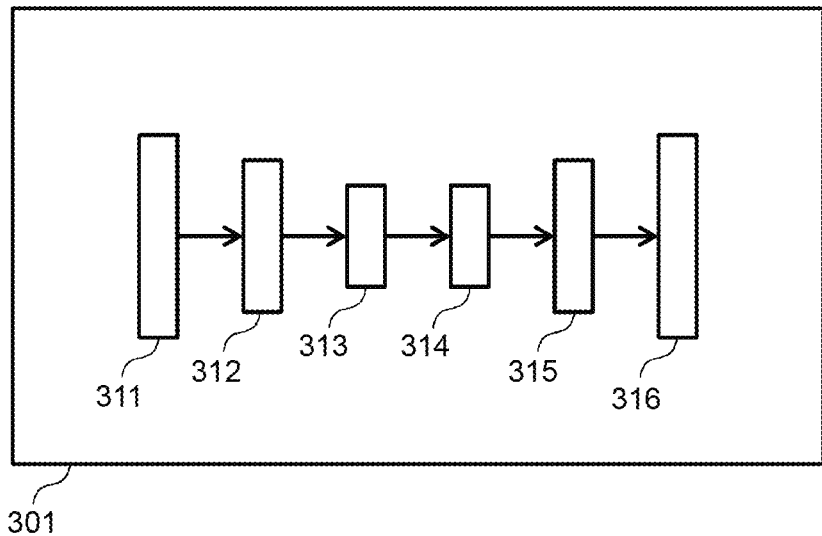
FIG. 3 is block diagram illustrating a configuration example of a deep learning model 301 included in a correlation image estimation unit 1201.

FIG. 3 is a block diagram illustrating a configuration example of a deep learning model 301 included in the correlation image estimation unit 1201. The deep learning model 301 can be configured, for example, by a convolutional neural network. The deep learning model 301 adjusts a parameter (such as connection weight between neurons and bias) so that the difference between the calculated correlation image 1213 and the estimated correlation image 1211 is decreased. The training process is performed by the parameter adjustment. The training can be performed by successively updating parameters, for example, by a back propagation method.

Specifically, the estimated parameter update unit 1204 calculates how a loss between output data (the estimated correlation image 1211) and training data (the calculated correlation image 1213) changes with respect to the parameters (for example, gradient). The estimated parameter update unit 1204 updates parameters little by little according to the change amount and adjusts parameters to obtain optimum output.

For example, the deep learning model 301 is configured with an input layer 311, an output layer 316, and a plurality of intermediate layers 312, 313, 314, and 315.

The design drawing 1102 (the image to be searched) and the SEM image 1104 (the template image) are input to the input layer 311, as the input images. From the input layer 311 to the intermediate layer 312 and from the intermediate layer 312 to the intermediate layer 313, data in the layers is aggregated by convolutional calculation with a predetermined coefficient filter and image reduction. The intermediate layer 313 stores data obtained by aggregating the design drawing 1102 and the SEM image 1104.

By calculating the correlation values between the aggregated data of the design drawing 1102 and the aggregated data of the SEM image 1104 from the intermediate layer 313 to the intermediate layer 314, the correlation data of both is calculated. This correlation data is stored in the intermediate layer 314.

From the intermediate layer 314 to the intermediate layer 315, and from the intermediate layer 315 to the output layer 316, data in the layers are developed by convolutional calculation with a predetermined coefficient filter and image enlargement. The data in the output layer 316 is the estimated correlation image 1211 between the design drawing 1102 and the SEM image 1104.

The estimated loss calculation unit 1203 calculates a loss between the estimated correlation image 1211 and the calculated correlation image 1213. The estimated parameter update unit 1204 updates a parameter (weight and bias) of the layers by the back propagation method by using the loss.

A model that receives an input of two images to be matched and outputs a correlation image can be trained by End-to-End training (training in which an input-output relationship is directly learned for a task to be learned). By the End-to-End training, in the intermediate layer 315, data that brings the template image and the image to be searched to close to each other can be automatically aggregated. This has an effect of absorbing a discrepancy between the input images. In addition, the intermediate layer 315 can automatically select data required for generating the estimated correlation image 1211 from the correlation data stored in the intermediate layer 314. There is an effect of estimating the estimated correlation image 1211 that stably comes close to the calculated correlation image 1213, even if a surplus pattern (a pattern that is not in the design drawing but is in the SEM image) appears in the SEM image.

In order to cause the discrepancy between the input images to be easily absorbed, a plurality of (multiple channel) images in the template image and the image to be searched may be input respectively. Examples of the multiple channel images include (a) images obtained by imaging the same imaging target with image capturing conditions changed, (b) images captured by different detectors as described below with reference to FIG. 6, and (c) an image captured by a detector and an image captured by an optical camera. The multiple channel images are not limited thereto and may be any images with which the discrepancy between the input images is easily absorbed.

Auxiliary information may be input to a deep learning model via one channel of an input image so that a contrast (a difference between a correlation value at a correct matching position and correlation value at another position) of the estimated correlation image 1211 increases. Examples of the auxiliary information include a weighted image that increases a brightness value of an area noticed for matching. By inputting such information, data of the noticed area is emphasized, and also the importance of the other portion of data is reduced, so that a correlation image with higher contrast can be obtained. The auxiliary information is not limited to these and may be any information with which an estimated correlation image with high contrast is easily estimated.

Figure 4:
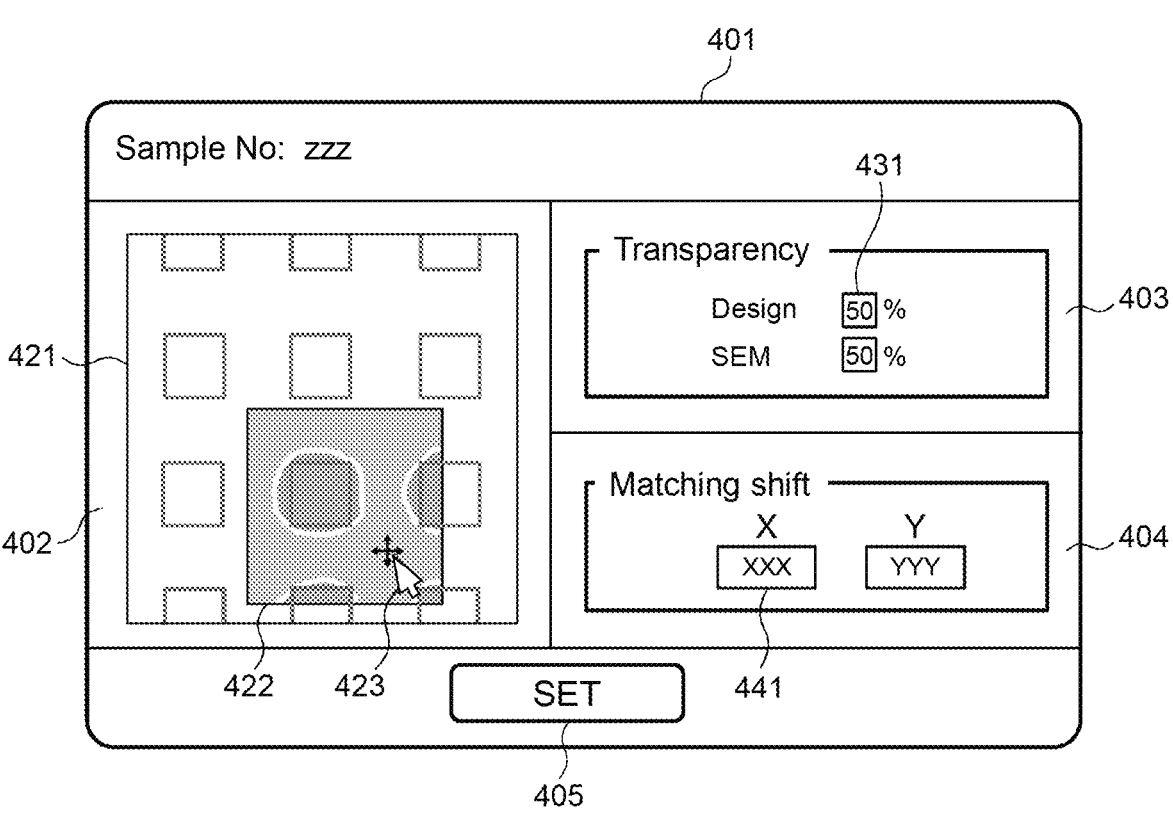
FIG. 4 is a diagram illustrating an example of a GUI to which a user inputs a matching shift amount.

FIG. 4 is a diagram illustrating an example of a graphical user interface (GUI) that enables a user to input a matching shift amount. A GUI 401 illustrated in FIG. 4 can be displayed, for example, on the input device 130 illustrated in FIG. 1. The user can input the input matching shift amount 1302 that is required when the correlation image estimation unit 1201 performs training with the GUI 401. The GUI 401 includes an image display area 402, an image transparency setting area 403, a matching shift amount input area 404, and a setting button 405.

The image display area 402 displays a design drawing 421, a SEM image 422, and a cursor 423. The design drawing 421 and the SEM image 422 are displayed in an overlay. The user can move the SEM image 422 to a position where the SEM image 422 matches with the design drawing 421 by the cursor 423. A movement amount of the SEM image 422 corresponds to a matching shift amount. The matching shift amount changed by the movement of the cursor 423 is reflected to a matching shift amount setting frame 441 in real time.

The user can directly input the matching shift amount by the matching shift amount setting frame 441 in the matching shift amount input area 404. The input matching shift amount is reflected by the relative movement of the SEM image 422 with respect to the design drawing 421.

The user can input the transparency (intensity) of the design drawing 421 and the SEM image 422 with respect to a frame 431 to easily check a matching result in the image transparency setting area 403.

When the user presses the setting button 405, the matching shift amount is supplied to the correlation image calculation unit 1202 as the input matching shift amount 1302.

The method of inputting the matching shift amount is described with reference to FIG. 4, but the method of inputting the matching shift amount is not limited to the above method and may be any method by which the matching shift amount is input.

Figure 5:
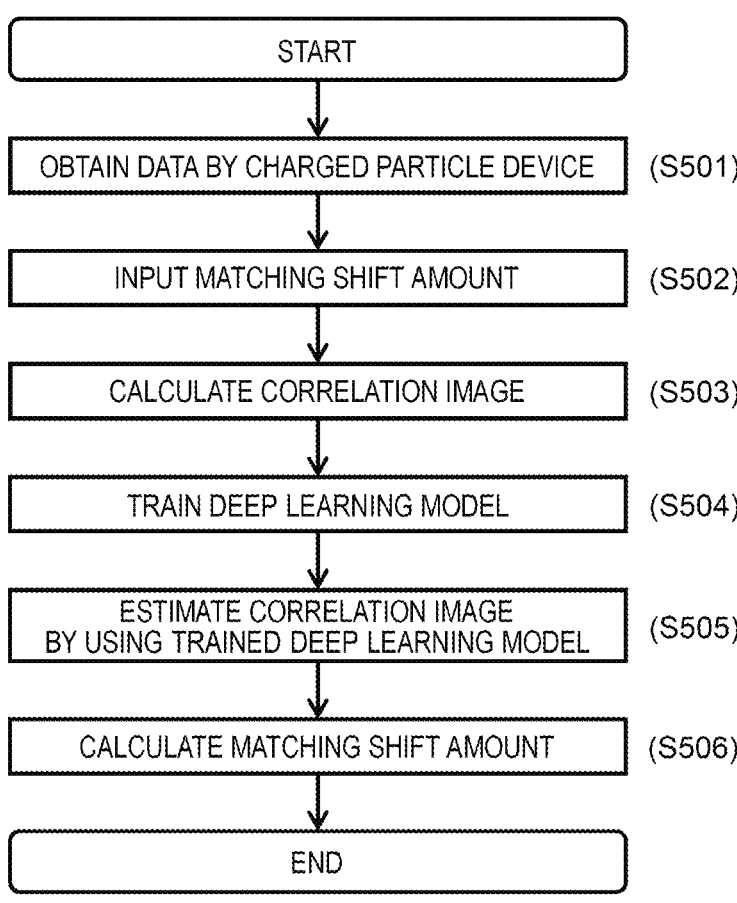
FIG. 5 is a flowchart illustrating an operation of the pattern matching device 100.

FIG. 5 is a flowchart illustrating an operation of the pattern matching device 100. Steps of FIG. 5 are described below.

(FIG. 5: Steps S501 to S502)

The pattern matching system 120 obtains the training data (the design drawing 1102 and the SEM image 1104) stored in the storage medium (S501). The user inputs the matching shift amount of both the design drawing 1102 and the SEM image 1104 by manually matching the design drawing 1102 and the SEM image 1104 from the GUI 401 illustrated in FIG. 4 (S502).

(FIG. 5: Step S503)

The correlation image calculation unit 1202 receives the design drawing 1102 and the input matching shift amount 1302 and calculates the calculated correlation image 1213.

(FIG. 5: Step S504)

The correlation image estimation unit 1201 receives the design drawing 1102 and the SEM image 1104 and generates the estimated correlation image 1211. The estimated loss calculation unit 1203 calculates the difference between the estimated correlation image 1211 and the calculated correlation image 1213, that is, the estimated loss 1214 of the correlation image estimation unit 1201 by using the loss function. The estimated parameter update unit 1204 calculates the changes in the weights and biases of the neural network by performing back propagation on the estimated loss 1214 and updates the values. By repeating the estimation and the back propagation as above one or more times, the training is performed.

(FIG. 5: Steps S505 to S506)

The correlation image estimation unit 1201 estimates the estimated correlation image 1211 by using the trained deep learning model (S505). The matching shift amount calculation unit 1205 calculates the estimated matching shift amount 1301 from the estimated correlation image 1211 (S506).

Figure 6:
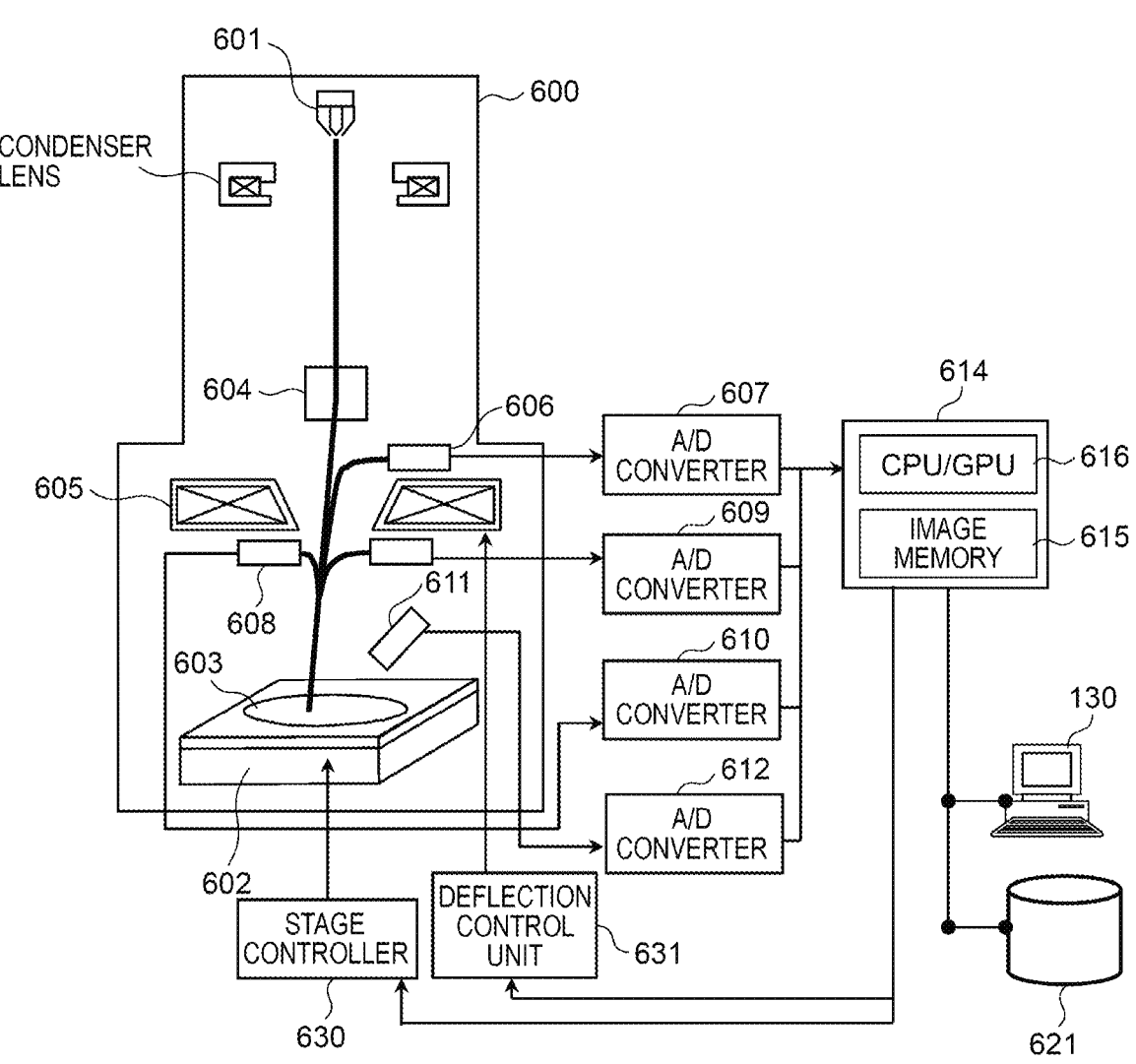
FIG. 6 illustrates a configuration example of a pattern measuring system including the pattern matching device 100 and a SEM 600.

FIG. 6 illustrates a configuration example of a pattern measuring system that includes the pattern matching device 100 and a SEM 600. The SEM 600 measures the pattern dimension of the semiconductor device, for example, formed on a semiconductor wafer 603. The calculation processing device or the computer system in the pattern measuring system can be configured, for example, as a control unit 614.

The control unit 614 includes calculation means (for example, a CPU/GPU 616) and storage means (for example, a memory including an image memory 615). In the storage means, information can be stored, for example, a program relating to the pattern matching process is stored.

The CPU/GPU 616 executes the program to perform the pattern matching process illustrated in FIG. 1. That is, the control unit 614 functions as the pattern matching device 100. In other words, the program causes the computer system to function as the calculation processing device included in the pattern matching device 100 to perform the pattern matching process illustrated in FIG. 1.

The SEM 600 generates electron beams from an electron gun 601. At an arbitrary position on the semiconductor wafer 603 that is a sample placed on a stage 602, a deflector 604 and an objective lens 605 are controlled to be irradiated with electron beams in focus.

Secondary electrons are emitted from the semiconductor wafer 603 irradiated with electron beams and detected by a secondary electron detector 606. The detected secondary electrons are converted into digital signals by an A/D converter 607. The image represented by the digital signal is stored in the image memory 615 in the control unit 614. This image is used, for example, as the SEM image 1104, and a training process indicated by the pattern matching process illustrated in FIG. 1 is performed by the control unit 614 or the CPU/GPU 616 based on this image.

A setting process required for these processes and process results are displayed by the input device 130.

The optical camera 611 may be used for alignment by using an optical camera with a lower magnification than the SEM. A signal obtained by imaging the semiconductor wafer 603 by the optical camera 611 is converted into a digital signal by the A/D converter 612 (the A/D converter

612 is not required when the signal from the optical camera 611 is a digital signal), the image indicated by the digital signal is stored in the image memory 615 in the control unit 614, and thus the CPU/GPU 616 performs an image process according to the purpose.

The SEM 600 may include a backscattered electron detector 608. When the backscattered electron detector 608 is included, a backscattered electron emitted from the semiconductor wafer 603 is detected by the backscattered electron detector 608, and a detected backscattered electron is converted into digital signals by an A/D converter 609 or 610. The image indicated by the digital signal is stored in the image memory 615 in the control unit 614, and the CPU/GPU 616 performs an image process according to the purpose.

The image memory 615 may be provided with storage means 621, independently. The control unit 614 may control the stage 602 via a stage controller 630 and may control the objective lens 605 or the like via a deflection control unit 631.

In the example of FIG. 6, the SEM 600 is illustrated as an example of the inspection device used together with the pattern matching device 100, but a device that can be used together with the pattern matching device 100 is not limited thereto. An arbitrary device (such as a measurement device and an inspection device) that obtains an image and performs the pattern matching process can be used together with the pattern matching device 100.

FIG. 7 illustrates another configuration example of the pattern measuring system of FIG. 6. The configuration example of FIG. 7 may be understood as another expression of the same configuration as that of FIG. 6. The pattern measuring system includes a SEM main body 701, a control device 702 that controls the SEM main body 701, a calculation processing device 704 that performs a pattern matching process of FIG. 1, a design data storage medium 705 that stores design data, and the input device 130 used for inputting information required for the calculation processing device 704.

The calculation processing device 704 includes calculation means (for example, a calculation processing unit 707) and storage means (for example, a memory 708). In the storage means, the information can be stored, for example, a program relating to a pattern matching process is stored.

The calculation processing unit 707 executes this program to perform the pattern matching process illustrated in FIG. 1. That is, the calculation processing device 704 functions as the pattern matching device 100. In other words, this program causes the computer system to function as the calculation processing device included in the pattern matching device 100 to perform the pattern matching process illustrated in FIG. 1.

The calculation processing unit 707 includes a recipe generation unit 711 that sets a condition of a template, a matching processing unit 712 that performs a pattern matching process based on the set template, and a pattern measurement unit 710 that performs a measuring process of the measurement position specified by the matching processing unit 712.

The secondary electrons, backscattered electrons, and the like obtained by scanning with electron beams are captured by a detector 703, and a SEM image (corresponding to the SEM image 1104 of FIG. 1) is generated based on detection signals thereof. The SEM image is sent to the calculation processing device 704 as an image to be searched of the matching processing unit 712 and as a signal for measurement by the pattern measurement unit 710.

In FIG. 7, the control device 702 and the calculation processing device 704 are configured as separate devices but may be an integrated device.

The signals based on the electrons captured by the detector 703 are converted into digital signals by the A/D converter built in the control device 702. Based on this digital signal, an image process according to the purpose is performed by image process hardware (such as CPU, GPU, ASIC, and FPGA) built in the calculation processing device 704.

The recipe generation unit 711 includes a cropping unit 713. The cropping unit 713 reads design data from the design data storage medium 705 and crops a portion thereof. The portion cropped from the design data is determined, for example, based on pattern identification data such as coordinate information set from the input device 130. The recipe generation unit 711 generates pattern data provided for matching based on the cropped design data (layout data). The pattern data generated herein can be used as design data 104 of FIG. 1.

The process in the matching processing unit 712 is as described with reference to FIG. 1. In the memory 708, design data, recipe information, image information, a measurement result, and the like are stored.

A portion or all of the processes in the calculation processing device 704 can also be implemented by a computer equipped with a CPU, a GPU, and a memory capable of storing images.

The input device 130 functions as an imaging recipe generation device and generates an imaging recipe. The imaging recipe indicates a measuring condition, and includes, for example, the coordinates of the electronic device required for measurement and inspection, the type of pattern, the imaging conditions (optical conditions and stage movement conditions).

The input device 130 may have a function of collating input coordinate information and information relating to the type of pattern with design data layer information or pattern identification information and reading required information from the design data storage medium 705.

The design data stored in the design data storage medium 705 can be expressed in any format, for example, a GDS format or an OASIS format. Software appropriate for displaying the design data can display design data in various formats of the design data or deal with the design data as graphic data. The graphic data may be line segment image information indicating the ideal shape of the pattern formed based on the design data and may be line segment image information on which a deformation process of performing exposure simulation on the pattern so as to be close to the actual pattern is performed.

The program that performs the process described with reference to FIG. 1 may be registered in the storage medium and a control processor including an image memory and supplying signals required for a scanning electron microscope may execute the corresponding program.

Embodiment 2

Figure 8:
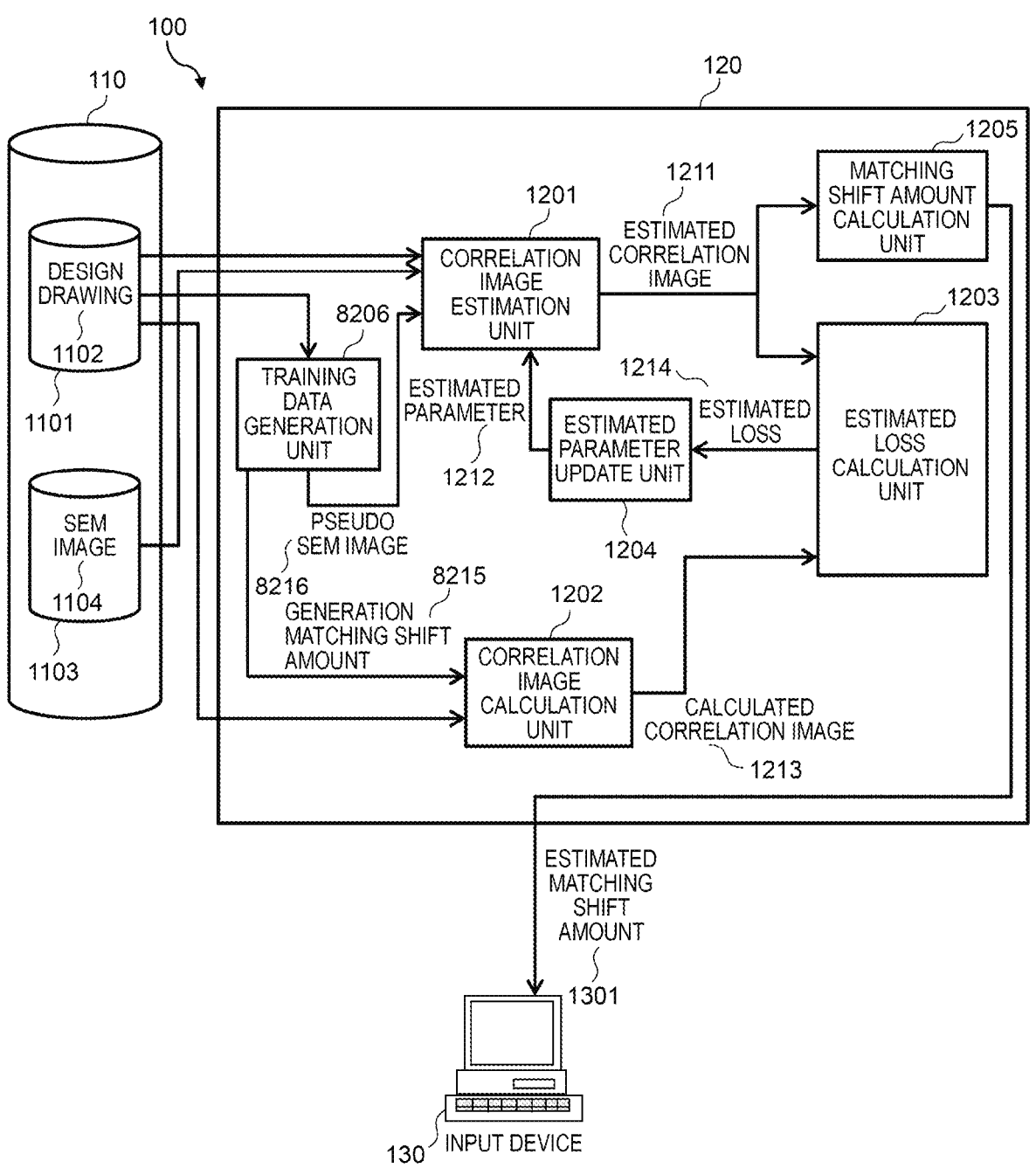
FIG. 8 illustrates a configuration example of the pattern matching device 100 according to Embodiment 2.

FIG. 8 illustrates a configuration example of the pattern matching device 100 according to Embodiment 2 of the disclosure. The same configuration elements as in Embodiment 1 (FIG. 1) are denoted by the same reference numerals in FIG. 8, and thus duplicate description is omitted below.

The pattern matching device 100 according to Embodiment 2 does not require manual input of a matching shift amount, imaging of an SEM image, or the like at the time of generating training data and can cause the training unit to perform training offline without depending on a scanning microscope. Specifically, the pattern matching system 120 includes a training data generation unit 8206 in addition to the configuration described with reference to FIG. 1. The training data generation unit 8206 is configured to generate a pseudo template image (a pseudo SEM image 8216) required for training and a generated matching shift amount 8215 (described below) from the image to be searched (the design drawing 1102). The input of the training data generation unit 8206 is not limited to the design drawing and may be another type, for example, a SEM image.

Figure 9:
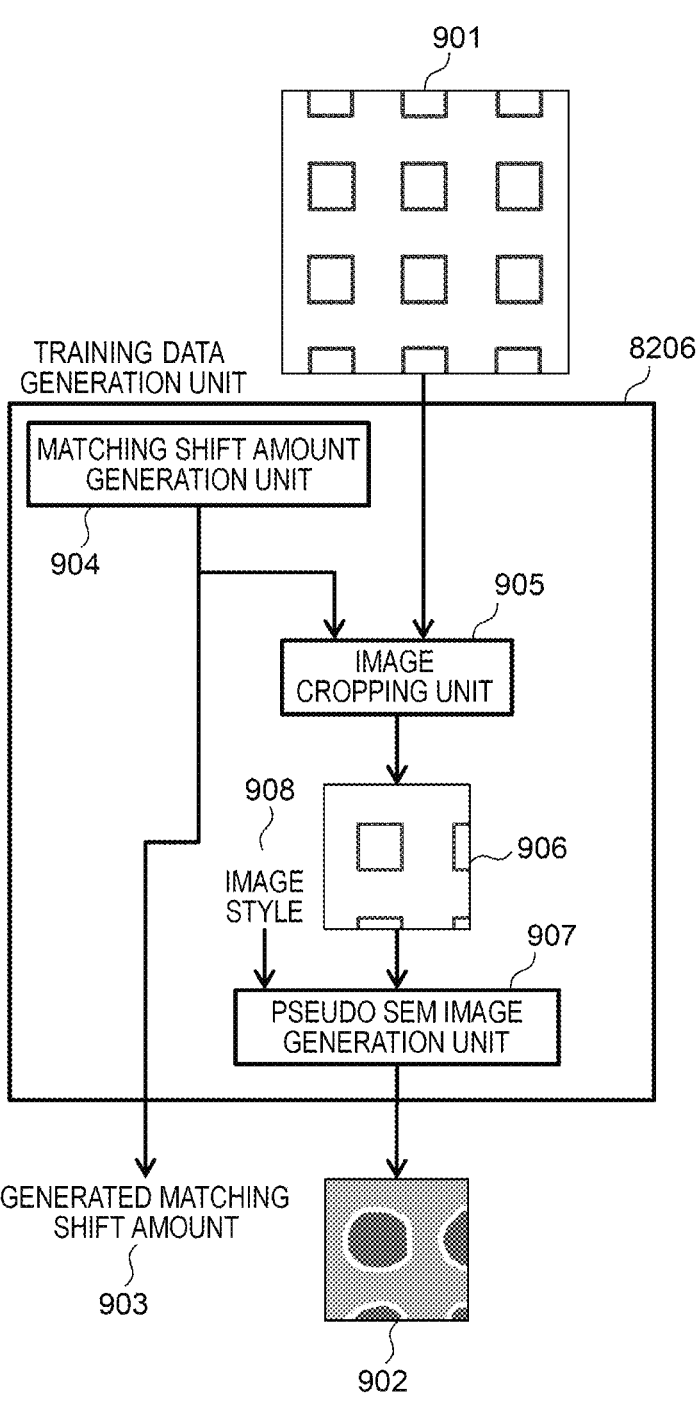
FIG. 9 illustrates a configuration example of a training data generation unit 8206.

FIG. 9 illustrates a configuration example of the training data generation unit 8206. An image 901 is an example of the design drawing 1102.

A matching shift amount generation unit 904 generates a matching shift amount to obtain a generated matching shift amount 903. Examples of the method of generating a matching shift amount include a method of randomly generating a shift amount within the possible range of the matching shift amount. The method of generating the matching shift amount is not limited to these methods and may be any method by which a matching shift amount is generated.

The generated matching shift amount 903 and the image 901 are input to an image cropping unit 905, and the image cropping unit 905 crops an image 906 having the same size as the template image.

A pseudo SEM image generation unit 907 generates a pseudo SEM image 902 from the image 906. The image quality of the generated pseudo SEM image is adjusted by an image style 908 (such as contrast, noise, and pattern deformation). The image style 908 may be input by the user or may be randomly generated. The pseudo SEM image generation unit 907 can be configured with a model that converts a learned design drawing into an image or a simulator that converts a design drawing into a SEM image. The pseudo SEM image generation unit 907 is not limited thereto and may be any unit that converts a pseudo image with adjustable image qualities.

As described in Embodiment 1, the deep learning model of the correlation image estimation unit 1201 is trained by using the pseudo SEM image 8216 generated by the training data generation unit 8206 and the design drawing 1102. The correlation image calculation unit 1202 generates the calculated correlation image 1213 from the generated matching shift amount 8215 and the design drawing 1102.

The estimated correlation image 1211 between the design drawing 1102 and the SEM image 1104 to be matched is estimated by using the trained deep learning model included in the correlation image estimation unit 1201. The matching shift amount calculation unit 1205 calculates the estimated matching shift amount 1301 from the estimated correlation image 1211.

As above, by using the training data generation unit 8206 in the training stage, training can be performed only with the design drawing 1102, and thus training can be performed offline. Further, by performing training by using the pseudo SEM image with an adjustable style, a model with high versatility can be trained.

Figure 10:
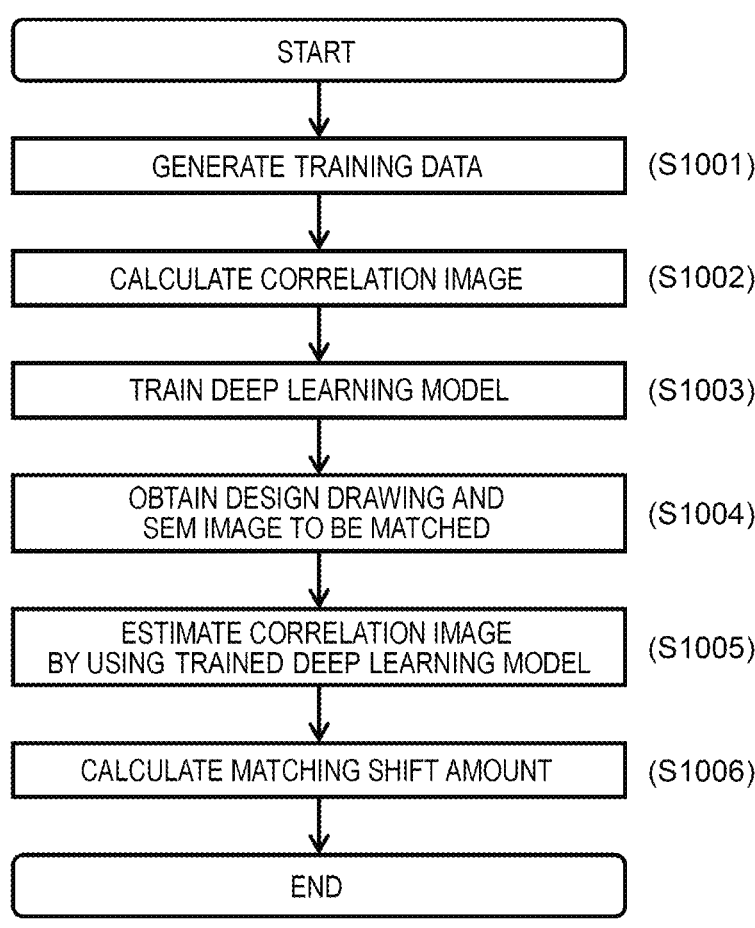
FIG. 10 is a flowchart illustrating an operation of the pattern matching device 100 according to Embodiment 2.

FIG. 10 is a flowchart illustrating an operation of the pattern matching device 100 according to Embodiment 2. Hereinafter, steps of FIG. 10 are described.

(FIG. 10: Step S1001)

The pattern matching system 120 obtains data (the design drawing 1102) stored in the storage medium, and the training data generation unit 8206 generates training data. The training data is configured with the pseudo SEM image 8216 and the generated matching shift amount 8215.

(FIG. 10: Step S1002)

The correlation image calculation unit 1202 receives the design drawing 1102 and the generated matching shift amount 8215 and calculates the calculated correlation image 1213.

(FIG. 10: Step S1003)

The correlation image estimation unit 1201 receives the design drawing 1102 and the pseudo SEM image 8216 and generates the estimated correlation image 1211. The estimated loss calculation unit 1203 calculates the difference between the estimated correlation image 1211 and the calculated correlation image 1213, that is, the estimated loss 1214 of the correlation image estimation unit 1201, by using a loss function. The estimated parameter update unit 1204 calculates the changes in the weight and bias of the neural network by performing back propagation on the estimated loss 1214 and updates the values thereof. By repeating the estimation and back propagation as above one or more times, training can be performed.

(FIG. 10: Steps S1004 to S1006)

After the training is completed, the pattern matching system 120 obtains the design drawing 1102 and the SEM image 1104 (S1004). The obtained image is input to the correlation image estimation unit 1201. The correlation image estimation unit 1201 estimates the estimated correlation image 1211 between the input images (S1005). The matching shift amount calculation unit 1205 calculates the estimated matching shift amount 1301 from the estimated correlation image 1211 (S1006).

Embodiment 2: Conclusion

In the pattern matching device 100 according to Embodiment 2, the training data generation unit 8206 automatically generates training data, and thus a labor of obtaining an image by inputting a matching shift amount or performing imaging with a scanning microscope by a user can be reduced, so that the training unit can perform training without depending on the scanning microscope.

Embodiment 3

In Embodiment 3 according to the disclosure, the pattern matching device 100 that can output matching shift amounts of respective layers in case of matching between design data and a SEM image having a plurality of layers is described. The configuration of the pattern matching device 100 is the same as those of Embodiments 1 to 2, and thus items such as matching shift amounts of respective layers are mainly described.

In the process of forming the semiconductor pattern, arrangement shift is likely to occur between respective layers of formed semiconductor patterns due to the influence of processing accuracy and environment. Accordingly, in the captured SEM image, interlayer shift with respect to the design drawing is likely to be generated. In the design drawing and the SEM image having a plurality of layers, respective estimation of the matching shift amounts of the respective layers in the subsequent measuring process has an effect, for example, that overlay measurement can be performed, or a measurement position can be adjusted with high precision. The overlay measurement herein is measurement of interlayer shift. For example, a matching shift amount of an upper layer pattern and a matching shift amount of a lower layer pattern are respectively measured, and the difference thereof is set as interlayer shift.

A flow of the training in Embodiment 3 is described. The design drawing 1102 is a design drawing including design information of respective upper and lower layers. The SEM image 1104 is a SEM image corresponding to a portion of the design drawing 1102. From the design drawing 1102, the lower layer pattern hidden by the upper layer pattern may be deleted in advance.

The design drawing 1102 and the SEM image 1104 are input to the correlation image estimation unit 1201, and the estimated correlation image 1211 is estimated. The estimated correlation image 1211 maintains a correlation image of the upper layer and a correlation image of the lower layer, for example, in the format of multiple channel images.

The correlation image calculation unit 1202 calculates the calculated correlation image 1213 to be training data. The calculated correlation image 1213 maintains the calculated correlation image of the upper layer and the calculated correlation image of the lower layer in the same manner as in the estimated correlation image 1211. As described in Embodiment 1, the calculated correlation image of the upper layer is calculated by using the design drawing of the upper layer and the matching shift amount of the upper layer. The matching shift amount of the upper layer is input from the input device 130 as described with reference to FIG. 4. As described in Embodiment 1, the calculated correlation image of the lower layer is calculated by using the design drawing of the lower layer and the matching shift amount of the lower layer. The matching shift amount of the lower layer is input from the input device 130 as described with reference to FIG. 4. When the lower layer pattern under the upper layer pattern on the SEM image is not seen, the lower layer pattern hidden by the upper layer pattern in the design drawing may be deleted in advance.

As described in Embodiment 1, by repeating the estimation and back propagation one or more times, a deep learning model that brings the estimated correlation image 1211 to be close to the calculated correlation image 1213 is trained.

By using a trained deep learning model included in the correlation image estimation unit 1201, the estimated correlation image 1211 between the design drawing 1102 and the SEM image 1104 to be matched is estimated. An estimated correlation image of the upper layer and an estimated correlation image of the lower layer are included in the estimated correlation image 1211.

The matching shift amount calculation unit 1205 calculates the estimated matching shift amount 1301 from the estimated correlation image 1211. The matching shift amount of the upper layer and the matching shift amount of the lower layer are included in the estimated matching shift amount 1301. The matching shift amount of the upper layer is calculated from the estimated correlation image of the upper layer. The matching shift amount of the lower layer is calculated from the estimated correlation image of the lower layer.

As above, in the subsequent measuring process, the respective calculation of the matching shift amounts of the upper and lower layers has an effect, for example, that overlay measurement can be performed, or a measurement position can be adjusted with high precision.

In order to perform the training offline, the training data may be generated by using the training data generation unit 8206 described in Embodiment 2. The training data generation unit 8206 generates the pseudo SEM image 8216 and the generated matching shift amount 8215 from the design drawing 1102. When the pseudo SEM image 8216 is generated, the training data generation unit 8206 first shifts the upper layer pattern and the lower layer pattern. By using the shifted design drawing, the pseudo SEM image 8216 is generated as described with reference to FIG. 9. The shift amount between upper and lower layers patterns is added to the generated matching shift amounts to obtain the matching shift amount of the upper layer and the matching shift amount of the lower layer.

By using the pseudo SEM image 8216 generated by the training data generation unit 8206 and the design drawing 1102, the deep learning model of the correlation image estimation unit 1201 is trained as described with reference to FIG. 1. The correlation image calculation unit 1202 calculates the calculated correlation image 1213 from the generated matching shift amount 8215 and the design drawing 1102.

By using the training data generation unit 8206, training can be performed only with the design drawing 1102, and thus training can be performed offline. Further, by performing training by using the pseudo SEM image 8216 with an adjustable style, a model with high versatility can be trained.

Figure 11:
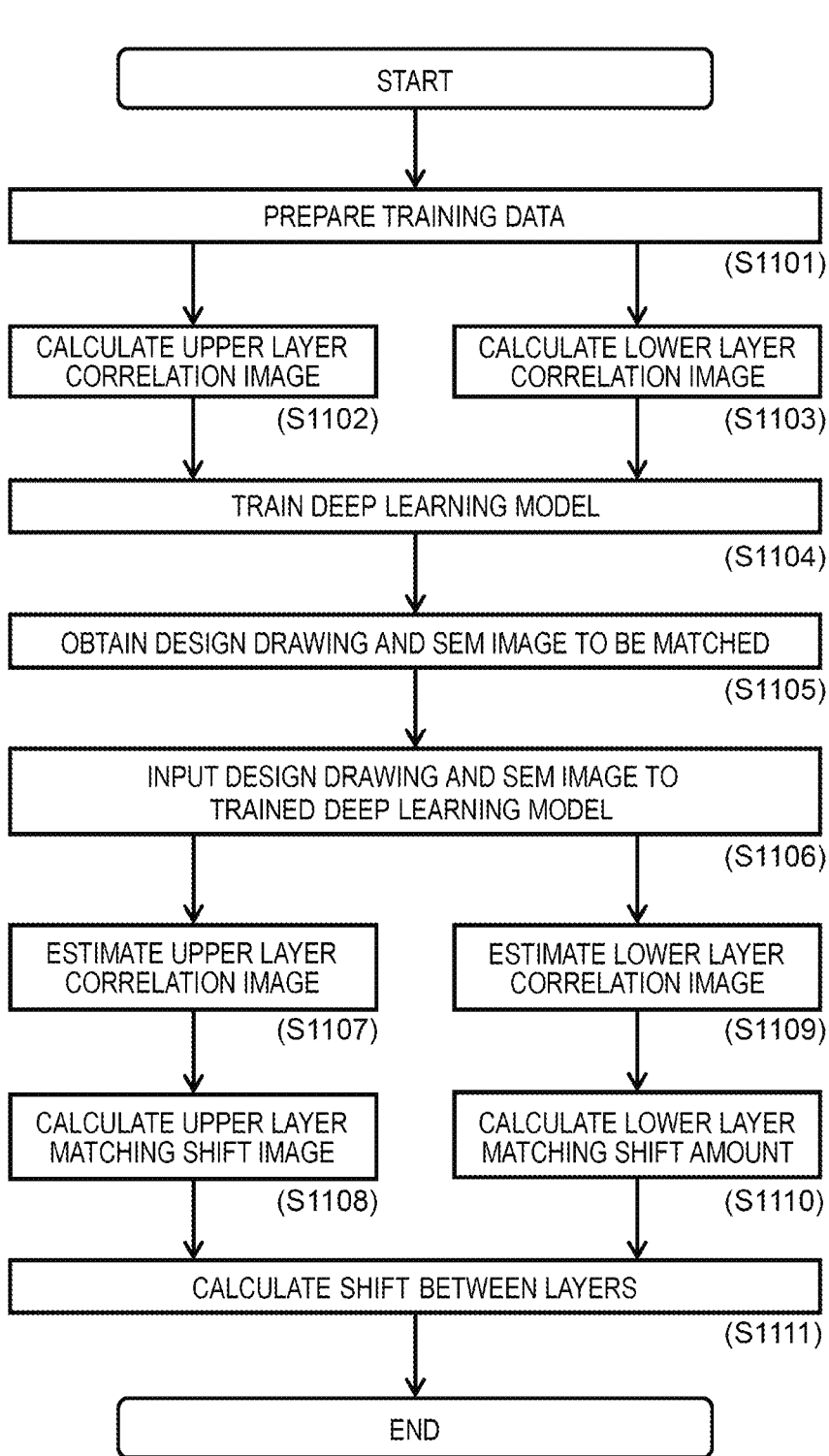
FIG. 11 is a flowchart illustrating an operation of the pattern matching device 100 according to Embodiment 3.

FIG. 11 is a flowchart illustrating an operation of the pattern matching device 100 according to Embodiment 3. Hereinafter, steps of FIG. 11 are described.

(FIG. 11: Step S1101: First part)

The pattern matching system 120 obtains the training data (the design drawing 1102 and the SEM image 1104) stored in the storage medium. In the GUI 401 illustrated in FIG. 4, the user inputs both of the matching shift amount of the upper layer and the matching shift amount of the lower layer by manually matching the design drawing and the SEM image. The design drawing, the SEM image, and the matching shift amount are prepared as training data.

(FIG. 11: Step S1101: Second part)

In case of using the training data generation unit 8206, the training data (the design drawing 1102) stored in the storage medium is obtained. The training data generation unit 8206 generates the pseudo SEM image and the generated matching shift amount. The design drawing, the pseudo SEM image, and the generated matching shift amount are prepared as training data.

(FIG. 11: Steps S1102 to S1103)

The correlation image calculation unit 1202 receives the upper layer portion of the design drawing 1102 and the matching shift amount of the upper layer and calculates the calculated correlation image of the upper layer (S1102). The correlation image calculation unit 1202 receives the lower layer portion of the design drawing 1102 and the matching shift amount of the lower layer and calculates the calculated correlation image of the lower layer (S1103).

(FIG. 11: Step S1104)

The correlation image estimation unit 1201 receives the design drawing 1102 and the SEM image 1104 (a pseudo SEM image in case of using the image generation unit) and generates the estimated correlation image 1211 including the estimated correlation image of the upper layer and the correlation image of the lower layer. The estimated loss calculation unit 1203 calculates the difference between the estimated correlation image 1211 and the calculated correlation image 1213, that is, the estimated loss 1214 of the correlation image estimation unit 1201, by using the loss function. The estimated parameter update unit 1204 calculates the changes in the weight and bias of the neural network by performing back propagation on the estimated loss 1214 and updates the values thereof. By repeating the estimation and back propagation as above one or more times, training is performed.

(FIG. 11: Steps S1105 to S1106)

After the training is completed, the pattern matching system 120 obtains the design drawing 1102 and the SEM image 1104 (S1105). The design drawing and the SEM image that are obtained are input to the trained deep learning model (S1106).

(FIG. 11: Steps S1107 to S1108)

The correlation image estimation unit 1201 estimates the estimated correlation image of the upper layer by using the trained deep learning model (S1107). The matching shift amount calculation unit 1205 calculates the matching shift amount of the upper layer from the estimated correlation image of the upper layer (S1108).

(FIG. 11: Steps S1109 to S1110)

Like the upper layer pattern, the correlation image estimation unit 1201 estimates the estimated correlation image of the lower layer by using the trained deep learning model (S1109). The matching shift amount calculation unit 1205 calculates the matching shift amount of the lower layer from the estimated correlation image of the lower layer (S1110).

(FIG. 11: Step S1111)

The pattern matching system 120 can calculate the interlayer shift described above by calculating the difference between the calculated matching shift amount of the upper layer and the calculated matching shift amount of the lower layer (vector difference). Otherwise, without calculating the interlayer shift, the matching shift amount of the upper layer and the matching shift amount of the lower layer may be used in the subsequent measuring process as the measurement position.

Embodiment 3: Conclusion

The pattern matching device 100 according to Embodiment 3 respectively calculates the matching shift amounts of the upper and lower layers in the subsequent measuring process and thus has an effect, for example, that overlay measurement can be performed, or a measurement position can be adjusted with high precision.

Modification Examples of Disclosure

The disclosure is not limited to the above embodiments, and various modification examples are included. For example, the above embodiments are specifically described for easier understanding of the disclosure, and thus are not limited to those necessarily having all the described configurations. In addition, a part of the configuration of a certain embodiment can be replaced with the configuration of another embodiment, and the configuration of a certain embodiment can be added to the configuration of another embodiment. In addition, for a part of the configuration of each embodiment, addition, deletion, or replacement of another configuration can be performed.

In Embodiment 3, calculation of matching shift amounts for each of the upper and lower layers is described, and for a sample having three or more layers, position shift between layers can be calculated by calculating matching shift amounts per layer and obtaining vector differences between the respective matching shift amounts.

In the above embodiments, a case where the correlation image calculation unit 1202 obtains a correlation image (the calculated correlation image 1213) between an image generated by cropping the design drawing 1102 and the design drawing 1102 is described. This is most desirable if accuracy as training data is required. Meanwhile, training data with various degrees of accuracy are required in some cases. In such a case, instead of or in combination with the cropping of the design drawing 1102, a correlation image as below may be obtained and used as training data. When the cropping is used in combination, a correlation image as below may be used as a part of the training data.

First Modification Example of Calculated Correlation Image 1213

A correlation image between a design drawing in the same type as the design drawing 1102 at the same position as the SEM image 1104 and the design drawing 1102 is calculated as the calculated correlation image 1213. In this case, a labor of inputting the matching shift amount by the user can be omitted.

Second Modification Example of Calculated Correlation Image 1213

A case where 1102 is a SEM image, and 1104 is a SEM image may be considered. The SEM image 1104 is a SEM image obtained by different means from that of the SEM image 1102 (for example, SEM image captured in a condition different from the image capturing condition of the SEM image 1102). In this case, a correlation image between a design drawing at the same position as the SEM image 1102 and a design drawing at the same position as the SEM image 1104 (of the same type as the design drawing) is calculated as the calculated correlation image 1213. In this case, there is an advantage of unifying the standard for calculating the calculated correlation image 1213, even if there are a plurality of types of SEM images.

Third Modification Example of Calculated Correlation Image 1213

When 1102 is a SEM image, and 1104 is a SEM image (obtained by different means from that of the SEM image 1102), a correlation image between a SEM image (such as a pseudo SEM image generated by an image generation tool) of the same type as the SEM image 1104 at the same position as the SEM image 1102 and the SEM image 1104 is calculated as the calculated correlation image 1213. In this case, a labor of preparing a design drawing can be omitted.

Fourth Modification Example of Calculated Correlation Image 1213

When 1102 is a SEM image, 1104 is a SEM image (obtained by different means from that of the SEM image 1102), a correlation image between the SEM image (such as pseudo SEM image generated by an image generation tool) of the same type as the SEM image 1102 at the same position as the SEM image 1104 and the SEM image 1102 is calculated as the calculated correlation image 1213. In this case, a labor of preparing the design drawing can be omitted.

Fifth Modification Example of Calculated Correlation Image 1213

When 1102 is a SEM image, and 1104 is a design drawing, a correlation image between a design drawing of the same type as the design drawing 1104 at the same position as the SEM image 1102 and the design drawing

1104 is calculated as the calculated correlation image 1213. In this case, there is an advantage of unifying the standard for calculating the calculated correlation image 1213, even if there are a plurality of types of SEM images.

Sixth Modification Example of Calculated Correlation Image 1213

When 1102 is a SEM image, and 1104 is a design drawing, a correlation image between a SEM image of the same type as the SEM image 1102 at the same position as the design drawing 1104 and the SEM image 1102 is calculated as the calculated correlation image 1213. In this case, a labor of preparing the design drawing can be omitted.

REFERENCE SIGNS LIST

100: pattern matching device
110: storage medium
1102: design drawing
1104: SEM image
120: pattern matching system
1201: correlation image estimation unit
1202: correlation image calculation unit
1204: estimated parameter update unit
1205: matching shift amount calculation unit
1206: estimated loss calculation unit
130: input device
8206: training data generation unit

The invention claimed is:

1. A pattern matching device that performs pattern matching between images, the device characterized by comprising:
   a computer system that performs pattern matching between a first image and a second image and outputs a shift amount between the first image and the second image as a pattern matching result, wherein
   the computer system includes a training unit that receives the first image and the second image as an input and estimates a first correlation image having, as a pixel value, a numerical value indicating correlation between the first image and the second image and outputs the first correlation image,
   the computer system calculates a second correlation image having, as a pixel value, a numerical value indicating correlation between the first image and a derivative image generated from the first image,
   the training unit performs training such that a difference between the first correlation image and the second correlation image is decreased, and
   the computer system calculates the shift amount between the first image and the second image based on the first correlation image.

2. The pattern matching device according to claim 1, characterized in that
   the computer system calculates a numerical value indicating correlation between the first image and the derivative image for each coordinate shift amount between the first image and the derivative image, and
   the computer system calculates an image having the numerical value calculated for each coordinate shift amount as a pixel value of a pixel corresponding to the coordinate shift amount as the second correlation image.

3. The pattern matching device according to claim 1, characterized in that the computer system calculates the shift amount by calculating shift amounts of pixel values, of which correlation between the first image and the second image is a standard value or more, among the pixel values included in the first correlation image, from the first image or the second image.

4. The pattern matching device according to claim 2, characterized in that the computer system further includes an interface that receives an input of designating the coordinate shift amount, and the computer system calculates the second correlation image according to the coordinate shift amount designated by the input received by the interface.

5. The pattern matching device according to claim 1, characterized in that the computer system inputs a plurality of first images respectively obtained under different conditions to the training unit and outputs the first correlation image indicating correlation between the second image and respective first images, the computer system inputs a plurality of second images respectively obtained under different conditions to the training unit and outputs the first correlation image indicating correlation between the first image and respective second images, or the computer system inputs the plurality of first images respectively obtained under different conditions to the training unit, inputs the plurality of second images respectively obtained under different conditions, and outputs the first correlation image indicating correlation between the respective first images and the respective second images.

6. The pattern matching device according to claim 1, characterized in that the computer system corrects at least any one of the first image and the second image so that a brightness value of a designated portion area in the first correlation image is higher than in the other areas in the first correlation image and inputs the first image and the second image after the correction to the training unit.

7. The pattern matching device according to claim 1, characterized in that the training unit estimates, as the first correlation image, a first direction correlation image having, as a pixel value, a first direction correlation value indicating a degree of correlation between the first image and the second image in a first direction, the training unit estimates, as the first correlation image, a second direction correlation image having, as a pixel value, a second direction correlation value indicating a degree of correlation between the first image and the second image in a second direction perpendicular to the first direction, and the computer system generates the first correlation image by synthesizing the first direction correlation image and the second direction correlation image.

8. The pattern matching device according to claim 1, characterized in that the computer system further includes a training data generation unit that generates training data used by the training unit for performing the training, the training data generation unit generates the derivative image by shifting coordinates of the first image and supplies the generated derivative image and the first image as the training data to the training unit, and the computer system calculates the second correlation image by using a coordinate shift amount used when the training data generation unit generates the derivative image or the derivative image generated by the training data generation unit.

9. The pattern matching device according to claim 8, characterized in that the training data generation unit supplies a deformed image generated by changing at least any one of an image quality of the derivative image and a shape pattern included in the derivative image as the training data to the training unit.

10. The pattern matching device according to claim 1, characterized in that the computer system performs pattern matching on an image of a sample having an upper layer and a lower layer, the first image includes a first upper layer image of the sample and a first lower layer image of the sample, the second image includes a second upper layer image of the sample and a second lower layer image of the sample, the training unit receives the first upper layer image or the first image, and the second upper layer image or the second image as an input and estimates and outputs a first upper layer correlation image having, as a pixel value, a numerical value indicating correlation between the first upper layer image or the first image and the second upper layer image or the second image, the training unit receives the first lower layer image or the first image, and the second lower layer image or the second image as an input and estimates and outputs a first lower layer correlation image having, as a pixel value, a numerical value indicating correlation between the first lower layer image or the first image, and the second lower layer image or the second image, the computer system calculates an upper layer shift amount between the first upper layer image or the first image, and the second upper layer image or the second image based on the first upper layer correlation image and the computer system calculates a lower layer shift amount between the first lower layer image or the first image, and the second lower layer image or the second image based on the first lower layer correlation image.

11. The pattern matching device according to claim 10, characterized in that the computer system calculates and outputs a shift amount between the upper layer of the sample and the lower layer of the sample based on the upper layer shift amount and the lower layer shift amount.

12. The pattern matching device according to claim 1, characterized in that the computer system calculates a third correlation image having, as a pixel value, a numerical value indicating correlation between the first image, a third image of the same type as the first image at a position corresponding to the second image, and the training unit further performs training such that a difference between the first correlation image and the third correlation image is decreased.

13. The pattern matching device according to claim 1, characterized in that the computer system calculates a fourth correlation image having, as a pixel value, a numerical value indicating correlation between a fourth image of the same type as the second image at a position corresponding to the first image and the second image, and the training unit further performs training such that a difference between the first correlation image and the fourth correlation image is decreased.

14. The pattern matching device according to claim 1, characterized in that the computer system calculates a fifth correlation image having, as a pixel value, a numerical value indicating correlation between a fifth image at a position corresponding to the first image and a sixth image of the same type as the fifth image at a position corresponding to the second image, and the training unit performs training such that a difference between the first correlation image and the fifth correlation image is decreased.

15. A pattern measuring system characterized by comprising:

the pattern matching device according to claim 1; and a scanning electron microscope that obtains the first image and the second image by imaging a sample and supplies the first image and the second image to the pattern matching device.

16. A non-transitory computer-readable medium storing a pattern matching program that causes a computer system to perform pattern matching between images, the program characterized by comprising:

causing the computer system to perform a step of performing pattern matching between a first image and a second image and outputting a shift amount between the first image and the second image as a pattern matching result;

causing the computer system to perform a step of supplying the first image and the second image to a training unit that receives the first image and the second image as an input, estimates and outputs a first correlation image having, as a pixel value, a numerical value indicating correlation between the first image and the second image, and receiving the first correlation image, in the step of performing pattern matching;

causing the computer system to perform a step of calculating a second correlation image having, as a pixel value, a numerical value indicating correlation between the first image and a derivative image generated from the first image, in the step of performing the pattern matching;

causing the training unit to be configured to perform training such that a difference between the first correlation image and the second correlation image is decreased, and causing the computer system to perform a step of calculating the shift amount between the first image and the second image based on the first correlation image, in the step of performing the pattern matching.

* * * * *